K. LYONS.
JAR WRENCH.
APPLICATION FILED DEC. 3, 1907.

901,247.

Patented Oct. 13, 1908.

Witnesses

Inventor
Kennedy Lyons.
By
Attorneys

UNITED STATES PATENT OFFICE.

KENNEDY LYONS, OF NEW RUMLEY, OHIO.

JAR-WRENCH.

No. 901,247.　　　Specification of Letters Patent.　　　Patented Oct. 18, 1908.

Application filed December 3, 1907. Serial No. 404,912.

*To all whom it may concern:*

Be it known that I, KENNEDY LYONS, citizen of the United States, residing at New Rumley, in the county of Harrison and State of Ohio, have invented certain new and useful Improvements in Jar-Wrenches, of which the following is a specification.

This invention provides a novel device for gripping the cap or closure of a jar or like receptacle having a threaded neck to which is fitted a threaded cap, said device or implement enabling the cap to be firmly gripped either when giving the final turn thereto, as when closing, or to start the cap, as when opening the jar or kindred receptacle.

For a full understanding of the invention and the merits thereof and also to acquire a knowledge of the details of construction and the means for effecting the result, reference is to be had to the following description and accompanying drawings.

Figure 1:
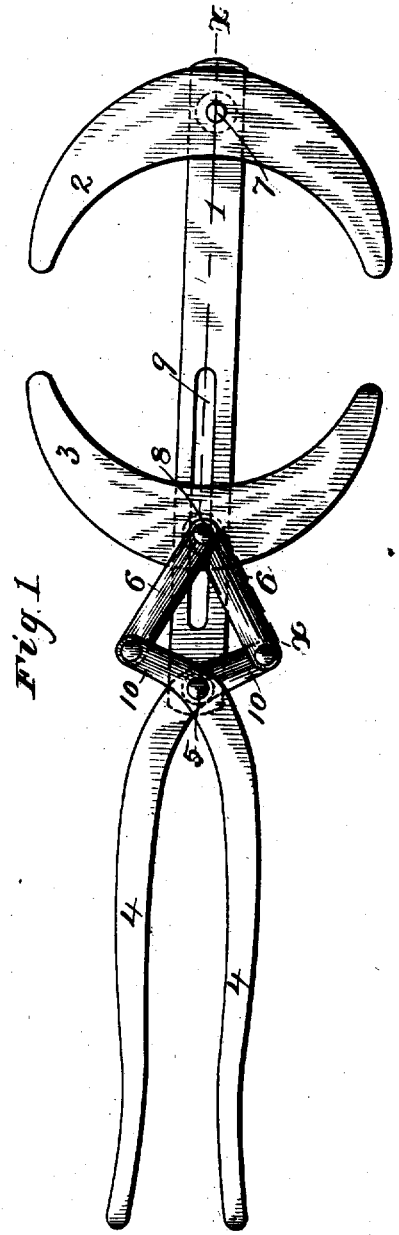
Figure 2:
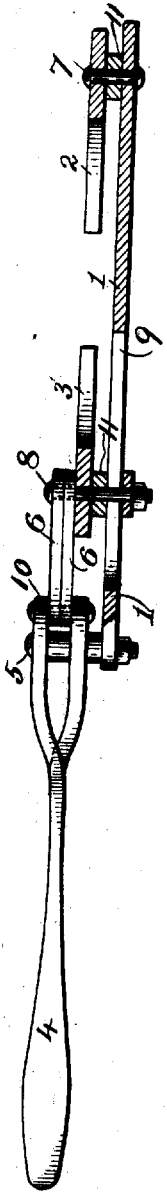

Figure 1 is a top plan view of an implement constructed in accordance with and embodying the essential features of the invention. Fig. 2 is a vertical central longitudinal section thereof on the line *x—x* of Fig. 1.

The implement or wrench consists of a bar 1, jaws 2 and 3, the former being relatively fixed and the latter movable, and actuating means for the movable jaw, the same consisting of members 4 pivoted to one another and to an end of the bar at 5, and links 6 connecting the short arms of the members 4 with the movable jaw 3. The jaws 2 and 3 are of similar formation, being of crescent form and arranged with their hollow sides facing inward so as to encircle the cap or closure of the jar or like receptacle to be turned by the expenditure of some considerable force. The jaw 2, while fixed, is connected at a central point to one end of the bar 1 by means of a pivot fastening 7, thereby admitting of the jaw turning so as to accommodate itself to strain and equalizing the pressure or force upon the cap or closure to be turned. The jaw 3 is mounted to have both a sliding and a pivotal movement and is connected with the bar 1 and with the links 6 by means of a fastening 8, the latter passing through a longitudinal slot 9 formed in the end portion of the bar 1 opposite to that provided with the fixed jaw 2. The jaws 2 and 3 are spaced some distance from the bar 1, washers 11 being interposed between them and the bar and mounted upon the respective fastenings 7 and 8.

The pivoted members 4 are of similar formation and cross near their inner ends and receive the pivot fastening 5 at the point of crossing, said pivot fastening also serving to connect the members 4 to the end of the bar 1. The inner ends of the pivoted members 4 extend outwardly, forming short arms 10 to which the outer ends of the links 6 are pivoted, the inner ends of the links being overlapped and receiving the pivot fastening 8.

The wrench or implement may be of any size and may be constructed of metal in any economical and convenient way, either by being cast or stamped from plate metal of proper thickness. The handle portions of the members 4 extend in line with the bar 1 and provide an increased leverage. Upon pressing the handle ends of the pivoted members 4 together, the short arms 10 thereof are likewise pressed together, thereby tending to move the jaw 3 towards the jaw 2 so as to grip the cap or closure that may be inserted between the two jaws 2 and 3. The jar or receptacle may be gripped and held firm in any manner, and the cap to be tightened or fastened, is received between the jaws 2 and 3 and firmly gripped by pressing the outer ends of the members 4 together, the wrench being moved in the required direction by the application of pressure to the outer ends of the members 4 either to tighten the cap, as when giving the final turn thereto, or for fastening the cap, when it is required to start the same when the jar or receptacle is to be opened.

Having thus described the invention, what is claimed as new is:

A jar wrench comprising a support having a longitudinal slot near one end, a curved jaw arranged transversely of the support and pivoted at its middle point thereto, a companion jaw similarly arranged with reference to the support as the first mentioned jaw, a pivot fastening connecting the second jaw to the support and mounted to slide in the longitudinal slot thereof, handle members crossed near their inner ends and pivoted to each other and to the said support, said inner ends of the handle members projecting in opposite directions, and links connecting the inner extremities of the handle members with the pivot fastening connecting the sliding jaw with the support.

In testimony whereof I affix my signature in presence of two witnesses.

KENNEDY LYONS. [L. S.]

Witnesses:
HARRY P. FINNICUM,
S. A. MAXWELL.